United States Patent
Schumacher et al.

(10) Patent No.: US 7,399,037 B2
(45) Date of Patent: Jul. 15, 2008

(54) DOUBLE-SPAR CHASSIS FOR AIRCRAFT PASSENGER SEAT

(75) Inventors: Markus Schumacher, Buxtehude (DE); Andrew Muin, Harsefeld (DE)

(73) Assignee: Airbus Deutschland GmbH (DE)

( * ) Notice: Subject to any disclaimer, the term of this patent is extended or adjusted under 35 U.S.C. 154(b) by 296 days.

(21) Appl. No.: 11/136,025

(22) Filed: May 24, 2005

(65) Prior Publication Data

US 2005/0264085 A1    Dec. 1, 2005

Related U.S. Application Data

(60) Provisional application No. 60/598,266, filed on Aug. 3, 2004.

(30) Foreign Application Priority Data

May 27, 2004   (DE) ................ 10 2004 025 982

(51) Int. Cl.
*A47C 7/02* (2006.01)
*A47C 15/00* (2006.01)
(52) U.S. Cl. .................. 297/452.18; 297/232
(58) Field of Classification Search .......... 297/232, 297/452.18, 16.1; 244/122 R
See application file for complete search history.

(56) References Cited

U.S. PATENT DOCUMENTS

| | | | | |
|---|---|---|---|---|
| 3,230,005 A | | 1/1966 | Staples | |
| 3,316,013 A | * | 4/1967 | Abel et al. | 297/16.1 |
| 5,553,923 A | * | 9/1996 | Bilezikjian | 297/452.2 |
| 5,558,309 A | * | 9/1996 | Marechal | 248/424 |
| 5,829,836 A | * | 11/1998 | Schumacher et al. | 297/257 |
| 6,126,236 A | * | 10/2000 | Wu | 297/325 |
| 6,478,256 B1 | | 11/2002 | Williamson | |
| 6,669,143 B1 | * | 12/2003 | Johnson | 244/122 R |
| 6,672,661 B2 | * | 1/2004 | Williamson | 297/232 |
| 6,746,086 B1 | | 6/2004 | Foster | |
| 2003/0209929 A1 | | 11/2003 | Muin et al. | |

FOREIGN PATENT DOCUMENTS

| | | |
|---|---|---|
| DE | 15 54 003 | 1/1971 |
| DE | 2 204 076 | 8/1972 |
| DE | 195 34 024 C2 | 7/1997 |
| DE | 102 14 104 C1 | 11/2003 |
| GB | 1 365 422 | 9/1974 |
| WO | WO-00/16661 | 3/2000 |

* cited by examiner

*Primary Examiner*—David R Dunn
*Assistant Examiner*—Tania Abraham
(74) *Attorney, Agent, or Firm*—Lerner, David, Littenberg, Krumholz & Mentlik, LLP

(57) ABSTRACT

The present application describes a chassis for an air passenger seat for an aircraft. According to one exemplary embodiment, the chassis has at least two first lateral parts, and a first and a second spar. The second spar is implemented in the foot region of the air passenger seat and, in addition to its supporting function, ensures baggage is secured. The assumption of additional objects by the chassis construction advantageously allows an air passenger seat to be manufactured with minimum material outlay and therefore weight outlay.

9 Claims, 4 Drawing Sheets

US 7,399,037 B2

DOUBLE-SPAR CHASSIS FOR AIRCRAFT PASSENGER SEAT

CROSS-REFERENCE TO RELATED APPLICATIONS

This application claims the benefit of the filing date of German Patent Application No. 10 2004 025 928.8, filed May 27, 2004 and U.S. Provisional Patent Application No. 60/598, 266 filed Aug. 3, 2004, the disclosures of which are hereby incorporated herein by reference.

FIELD OF THE INVENTION

The present invention relates to a chassis for an air passenger seat, particularly for a passenger cabin of an aircraft. In particular, the present invention relates to a chassis for a seat for an aircraft and a chassis for a seating group for a vehicle having a corresponding seat, as well as a method for manufacturing a chassis for an air passenger seat.

BACKGROUND OF THE INVENTION

Air passenger seats comprise a frame to which functional components such as seat surfaces, backrests, and armrests are attached. Such air passenger seats may be equipped as folding seats having pivotable seat surfaces and backrests. Typically, additional components for additional tasks, such as mechanisms for folding seats, joints, bearings, baggage supports, and foot supports are mounted on the air passenger seats. The frames of air passenger seats must have a high stability because of the typically high load. It is desirable to use the lightest possible type of construction in this case. Currently, single-spar supports and double-spar supports having horizontal spar offset are used in the construction of chassis for air passenger seats.

The frame constructions currently used for air passenger seats have the disadvantage that they have been designed only according to stabilizing aspects. I.e., they are optimized for supporting seats and backrests, for example. Until now, additional components have had to be provided for tasks such as baggage retention or foot supports. Thus, a greater material requirement and additional weight arises. Furthermore, single-spar constructions have the disadvantage that high torsion forces arise and therefore a large spar profile must be used.

SUMMARY OF THE INVENTION

According to an exemplary embodiment of the present invention, a chassis for an air passenger seat for an aircraft is provided which comprises at least two first lateral parts, a first spar, and a second spar. The first and the second spars are positioned essentially horizontally in the at least two first lateral parts. The second spar is implemented in the foot region of the air passenger seat and ensures baggage retaining due to construction. Baggage retainers are provided for the purpose of being able to absorb the horizontal forces acting in the flight direction, which may arise due to baggage in the event of strong braking, for example.

The second spar in the foot region may fulfil the function of a baggage retainer in addition to stabilizing the chassis. The attachment in the foot region allows the space under the seat to be exploited as an additional baggage stowing space. Since typically space for housing objects carried along is limited in the passenger cabins, it may be advantageous to be able to make use of an additional baggage stowing space. In known constructions, additional add-on elements must be provided for baggage retention.

This may allow to provide to a light and cost-effective support construction for air passenger seats, which provides sufficient stability and provides additional objects by construction, such as baggage retention or foot supports, solely via the design of the frame construction, without having to make use of additional components.

According to a further exemplary embodiment of the present invention, at least one second lateral part is provided. This at least one second lateral part provides the chassis construction with an additional stabilizing effect. This at least one second lateral part is typically not anchored to the seat rails on the passenger cabin floor. The at least one second lateral part prevents the horizontal spars from being able to shift in relation to one another. If the two horizontally positioned spars are additionally positioned offset in the vertical direction, the at least one second lateral part, if the spar attached higher is loaded, causes pressure forces to be converted into pressure forces on the lower of the two spars via the at least one lateral part. Spars may be implemented as tubes. Tubes have the property that they are very stable for absorbing pressure forces with simultaneously low material outlay. Through targeted profiling, particularly milling, the material outlay may be reduced even further. In addition, this construction may allow for the use of lighter materials, such as aluminium. Since the stability of such a framework-type construction may increase with increasing distance between the two spars, through a vertical offset of the spars, less horizontal space may be advantageous required with a greater distance of the two spars. This is particularly advantageous in aircraft, in which it is important to house as many air passenger seats as possible in a small area.

According to a further exemplary embodiment of the present invention, the first spar may be designed for mounting a seat surface. A part of the frame construction thus advantageously provides the stop and the support of a seat surface, without having to provide additional components for this purpose.

According to a further exemplary embodiment of the present invention, at least one stop for mounting a seat surface is provided. A high degree of design freedom in positioning a seat surface may thus arise. A stop for a seat surface may be produced with a relatively low material outlay.

According to a further exemplary embodiment of the present invention, the second spar in the foot region may allow for the implementation of a foot support. If the second spar is not used in its function as a baggage retaining bar, it may provide a person sitting behind the air passenger seat with the possibility of assuming a comfortable seating position with legs stretched out on the foot support. Because of the supporting function of the second spar, it may be designed in regard to stability in such a way that, without anything further, it may provide the function of a foot support without additional weight.

According to a further exemplary embodiment of the present invention, the at least two first lateral parts are fashioned from a first rear girder part and a first front girder part. Receivers for the first and second spars, for example, are located in the girder parts. The split line may thus advantageously be designed in such a way that an assembly process may be significantly simplified.

According to a further exemplary embodiment of the present invention, a seating group for an aircraft is provided, comprising at least two seats, at least two first lateral parts, and at least two spars, wherein the at least two spars stabilize two lateral parts and the second spar being implemented in the foot region of the seating group in order to ensure baggage is secured. For example, the vehicle may be an aircraft. Providing the function of securing baggage through the second spar may save additional components, which otherwise would, if used, result in additional weight. In addition, this function may be provided for all seats of the seating group by a continuous component. One of the spars may thus also assume the function of baggage retention in addition to the support function for the lateral parts of the chassis.

According to a further exemplary embodiment of the present invention, an aircraft is provided, which comprises a chassis for an air passenger seat according to the present invention or a seating group according to the present invention. Such an aircraft may have a reduced weight.

A further embodiment of the present invention relates to an aircraft having at least one chassis for an aircraft seat or having at least one seating group according to the present invention.

According to a further exemplary embodiment of the present invention, a method for manufacturing a chassis for an air passenger seat is provided. Through the special vertical position of the spars, the split line may be positioned in such a way that assembly advantages may thus arise. The spars are supported between parts of the lateral parts.

BRIEF DESCRIPTION OF THE DRAWINGS

In the following, exemplary embodiments of the present invention will be described with reference to the attached figures.

Identical reference numbers are used for identical or corresponding elements in the present description.

DETAILED DESCRIPTION

Figure 1:
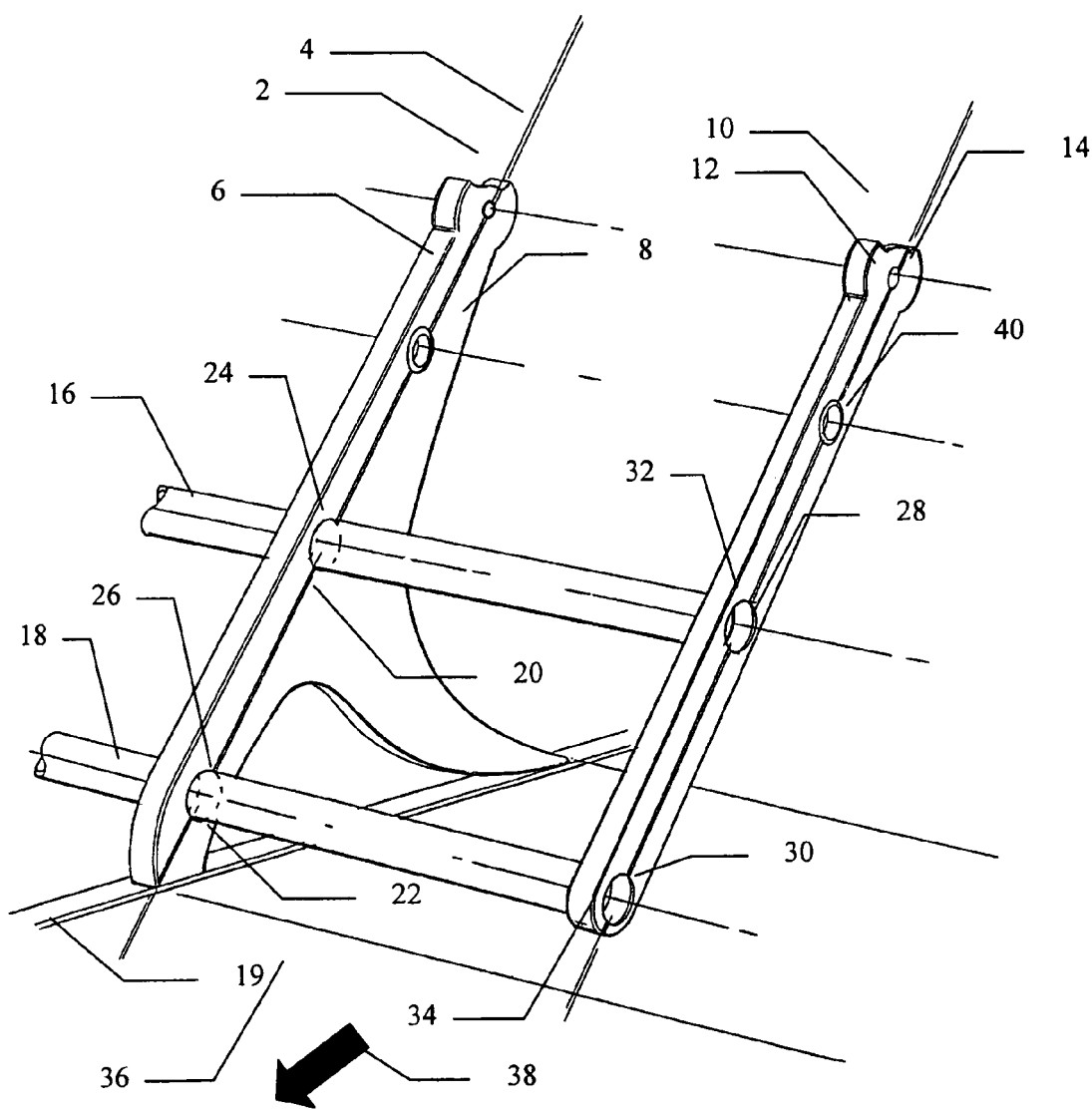
FIG. 1 shows a three-dimensional partial side view of an exemplary embodiment of a chassis for an air passenger seat for an aircraft according to the present invention.

FIG. 1 shows a schematic three-dimensional partial side view of an exemplary embodiment of a chassis for an air passenger seat for an aircraft according to the present invention. The chassis comprises a first lateral part 2, a first spar 16, a second spar 18, and a second lateral part 10. The first lateral part 2 comprises a first front girder part 6 and a first rear girder part 8. At least one first receiver 20 and at least one second receiver 22 are implemented in the first rear girder part 8. At least one third receiver 24 and one fourth receiver 26 are implemented in the first front girder part 6. At least one fifth receiver 28 and at least one sixth receiver 30 are implemented in the second rear girder part 14 and at least one seventh receiver 32 and at least one eighth receiver 34 are implemented in the front girder part 12. The first rear girder part 8 and the first front girder part 6 as well as the second rear girder part 14 and the second front girder part 12 are assembled on a split line 4. The first spar 16 and the second spar 18 are fixed between the first rear girder part 8 and the second front girder part 6. The first rear girder part 8 simultaneously forms the seat foot of the chassis construction and may be anchored to the seat rail 19. The second spar 18 is mounted vertically and horizontally offset from the first spar 16 in flight direction 38. In this way and through the connection to the second lateral part 10, the construction is provided with stability similar to a framework. Forces which act on the first spar in the direction of the passenger cabin floor 36 are converted via the second lateral part 10 into pressure forces on the second spar 18. Weight may thus advantageously be saved for the spar 18 through targeted profiling and a lighter material, such as aluminum. Because of its lower installation position near the foot space, the spar 18 may be used as a baggage retainer. It must only be able to absorb forces which act in flight direction 38 for this purpose and, because of its stable implementation, it is possible to use the second spar 18 as a foot support if it is not used as a baggage retainer. The first spar 16 may be used as a stop or support for a seat surface which is attached on a pivot axis mounted in receiver 40, for example. It is possible to mount further add-on parts on this chassis, such as armrests, bearings, or restoring elements.

Figure 2:
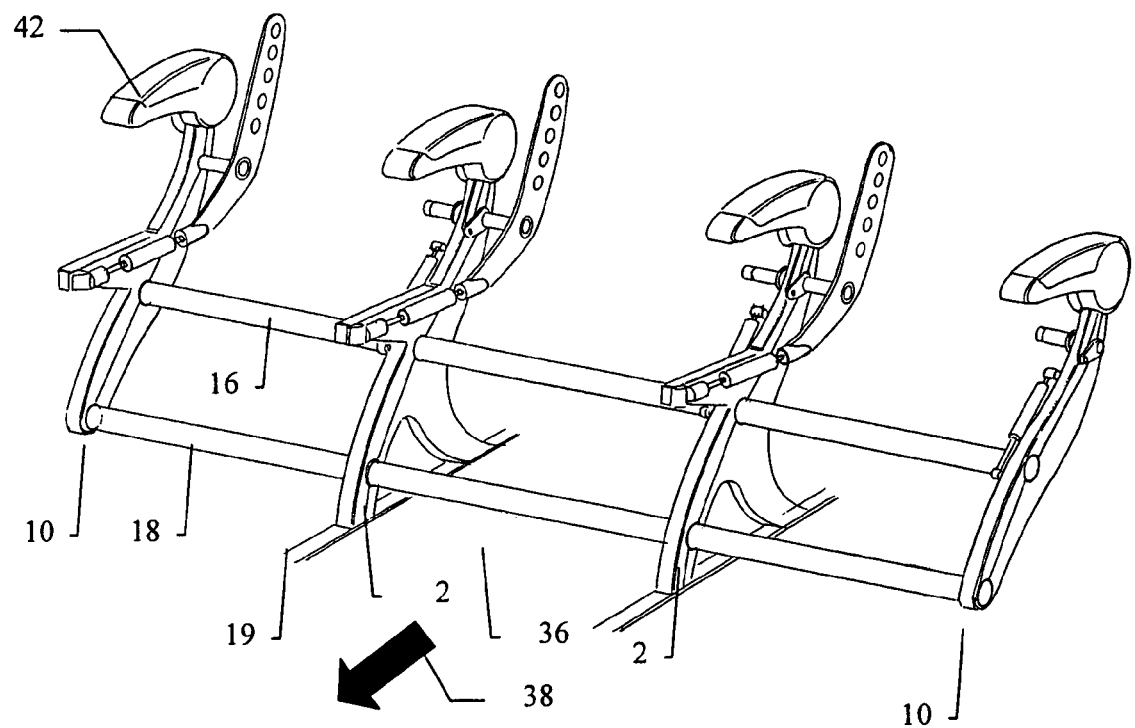
FIG. 2 shows a three-dimensional side view of a chassis for a seating group for air passenger seats for an aircraft according to the present invention.

FIG. 2 shows a three-dimensional side view of a chassis for a seating group for air passenger seats for an aircraft according to the present invention. A first spar 16 and a second spar 18 are shown, which are installed in a horizontal position between the two lateral parts 2. The first spar 16 and the second spar 18 form a support for stabilizing the at least two first lateral parts 2. The second spar 18 forms a first distance to the passenger cabin floor 36 and the first spar 16 forms a second distance to the passenger cabin floor 36, the second distance being greater than the first distance. The second spar 18 is thus attached closer to the foot space than the first spar 16. This lower position allows the spar 18, in addition to its stabilizing frame function, to additionally assume the function of a baggage retainer, to be used for stowing hand baggage of the passengers, for example, or, if it is not used as a baggage retainer, to be used as a foot support for persons sitting behind the chassis in flight direction 38. The two first lateral parts 2 are essentially used for supporting and fixing the construction on the floor 36, while in contrast the first spar 16 and the second spar 18 implement a support which is used to stabilize the construction. The second lateral parts 10 are used for further stabilization and for distributing pressure forces of a seat surface mounted on the first spar 16, for example. Additional components, such as armrests 42, may be mounted on the first lateral parts 2 and on the second lateral parts 10. The second lateral parts 10 may be implemented in such a way that they have no direct contact with the floor 36 of the passenger cabin. In a bank of seats having three spaces, two first lateral parts 2 and two second lateral parts 10 may therefore be sufficient. Since typically the first lateral parts 2 are positioned in rails on the cabin floor, positioning two rails may thus be sufficient for a group of three seats or even a multi-seat seating group (group of five).

Figure 3:
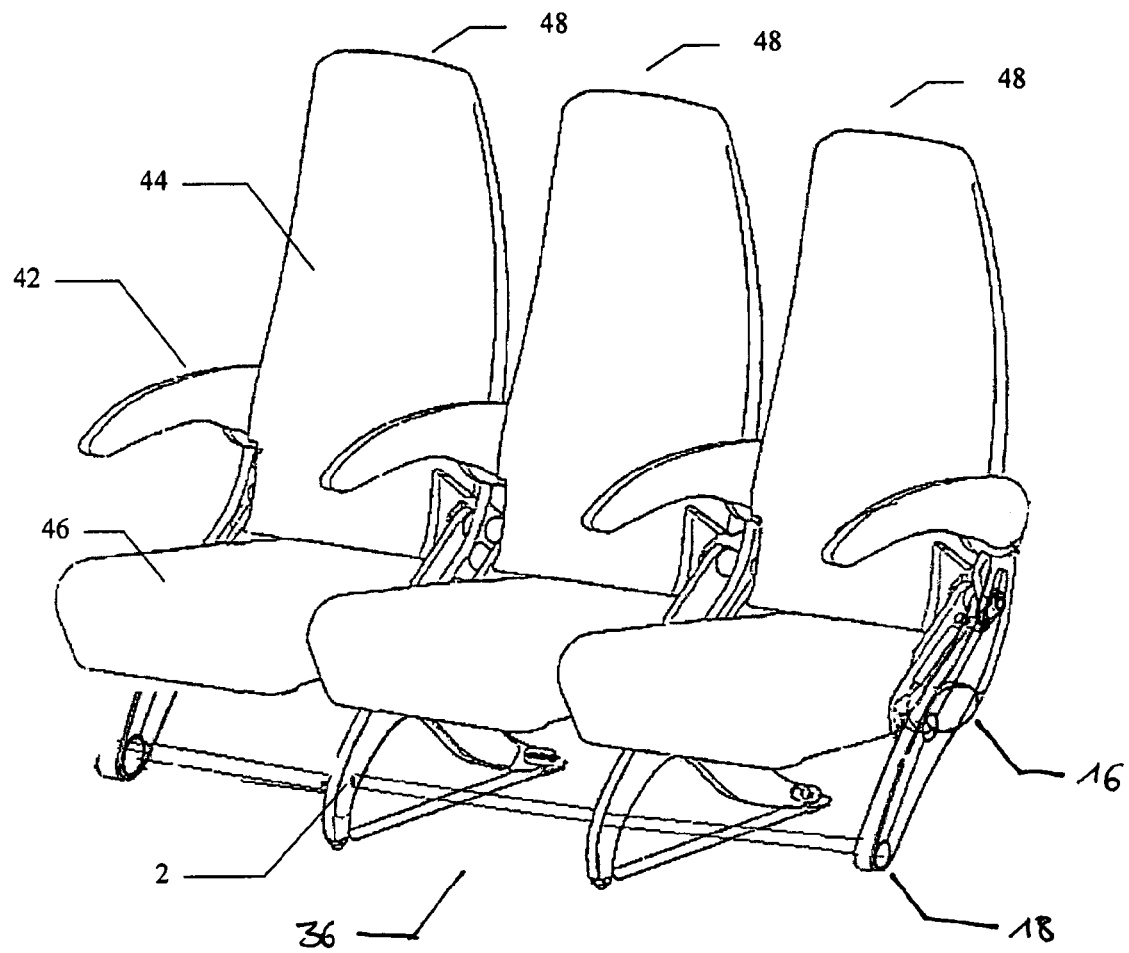
FIG. 3 shows a simplified schematic three-dimensional side view of a seating group according to an exemplary embodiment of the present invention.

FIG. 3 shows a simplified, schematic three-dimensional side view of a seating group according to an exemplary embodiment of the present invention. Three individual seat spaces 48 are illustrated in FIG. 3. The individual seats 48 shown comprise a backrest 44 and a seat surface 46. The seat surface 46 rests on the first spar 16. The second spar 18 is implemented in the foot region as a continuous spar over all individual seats. A space in which baggage may be stowed, delimited by the passenger cabin floor 36, the second spar 18, and the seat surface 46, thus arises below the individual seats. The spar 18 represents a baggage retainer in addition to its stabilizing function for the chassis.

Figure 4:
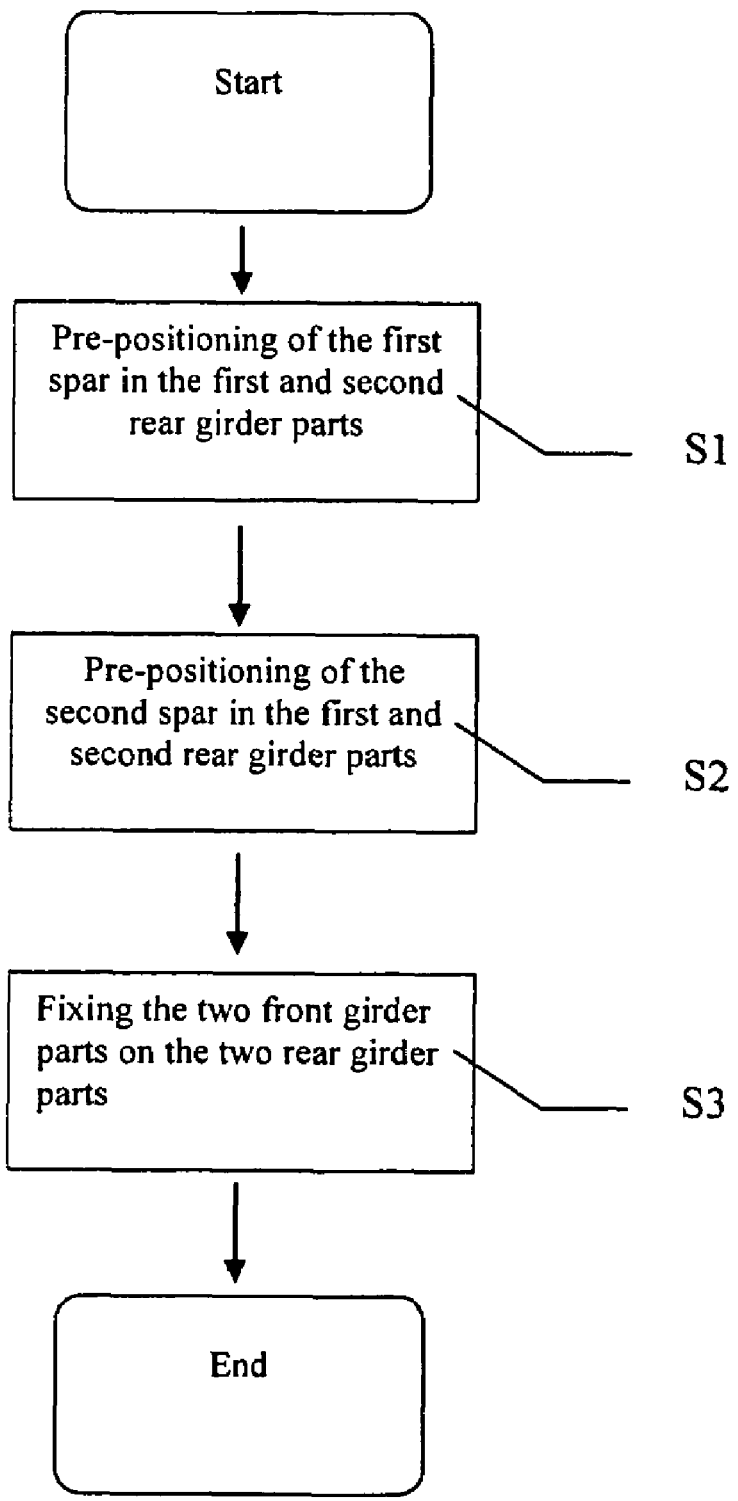
FIG. 4 shows a flowchart of a method for manufacturing a chassis for an air passenger seat for an aircraft according to the present invention.

FIG. 4 shows a flowchart for a method for manufacturing a chassis for an air passenger seat for an aircraft. The chassis (as shown in FIG. 1, for example) for an air passenger seat comprises at least one first rear girder part 8, comprising a first receiver 20 and a second receiver 22 for a spar, at least one first front girder part 6, comprising a third receiver 24 and a fourth receiver 26 for a spar, and at least one second rear girder part 14, comprising a fifth receiver 28 and a sixth receiver 30 for a spar, and at least one second front girder part 12, comprising a seventh receiver 32 and an eighth receiver 34 for a spar. In addition, the chassis comprises a first spar 16 and a second spar 18. The method comprises the steps described in the following. In a first step S1, the first spar 16 is pre-positioned in the first girder part 8 and the second rear girder part 14 in the corresponding receivers. In order to be able to position the first spar 16 precisely and secure it against slipping during assembly, it is laid in half-moon-shaped receivers 20 and 28. In the same way, the second spar 18 is pre-positioned and secured against slipping in the half-moon-shaped recesses 22 and 30 in step S2. During assembly, the fact is exploited that the spars 16 and 18 are held by gravity in the receivers 20, 28, 22, and 30, which are tailored to their size. It is therefore not necessary to have to make use of an additional tool which holds the components together during assembly. The assembly time may thus be shortened. In the final step S3, the two front girder parts 6 and 12 are fixed on the two rear girder parts 8 and 14. The type and also the position of the fixing may be selected relatively freely in accordance with aspects of simplest assembly or best accessibility. This is also true of the method. For example, screwing or riveting would be conceivable. The recesses 20, 22, 24, 26, 28, 30, 32, and 34 may be tailored to the cross-section of the spars 16 and 18. The recesses may thus press very tightly against the spars 16 and 18. Through the contact pressure during assembly of the girder parts 6, 8, 12, 14, the spars may therefore be assembled in such a way that additional attachment material such as screws for fixing the spars is not necessary, but the spars are nonetheless sufficiently secured against shifting or slipping. Implementing the interior of the receivers 20, 22, 24, 26, 28, 30, 32, and 34 with a rough structure in order to elevate the friction, for example, would also be conceivable.

In addition, it should be noted that "comprising" does not exclude other elements or steps and "a" or "an" does not exclude a plurality. Furthermore, it should be noted that features or steps which have been described with reference to one of the exemplary embodiments above may also be used in combination with other features or steps of other exemplary embodiments described above. Reference numbers in the claims shall not be construed as limiting the scope of the claims.

The invention claimed is:

1. A chassis for an air passenger seat for an aircraft, comprising:
   at least two first lateral parts,
   a first spar and
   a second spar;
   wherein the first and the second spars are positioned essentially horizontally between the at least two first lateral parts;
   wherein the second spar is formed in a foot region of the air passenger seat for securing baggage;
   wherein the first and the second spars form a support for stabilizing the at least two first lateral parts;
   wherein the at least two first lateral parts are formed from a rear girder part and a front girder part;
   wherein the rear girder part and the front girder part are separable and adapted for being assembled on a split line along a longitudinal direction of the rear girder part and the front girder part; and
   wherein receivers for the first and second spars are formed between the rear and front girder parts.

2. The chassis for an air passenger seat of claim 1, further comprising at least one second lateral part.

3. The chassis for an air passenger seat of claim 2,
   wherein the second lateral part is formed from a rear girder part and a front girder part; and
   wherein receivers for the first and second spars are formed between the rear and front girder parts.

4. The chassis for an air passenger seat of claim 1,
   wherein the first spar is adapted for mounting a seat surface.

5. The chassis for an air passenger seat of claim 1, wherein said first spar acts as a stop for a seat surface.

6. The chassis for an air passenger seat of claim 1,
   wherein the second spar is adapted as a foot support.

7. A seating group for an air vehicle, comprising:
   at least two seats;
   at least two first lateral parts;
   at least one first spar and one second spar;
   wherein the first and the second spars are positioned essentially horizontally between the at least two first lateral parts;
   wherein the second spar is formed in a foot region of the seating group for securing baggage; and
   wherein the first and the second spars stabilize the at least two first lateral parts;
   wherein the at least two first lateral parts are formed from a rear girder part and a front girder part;
   wherein the rear girder part and the front girder part are separable and adapted for being assembled on a split line along a longitudinal direction of the rear girder part and the front girder part; and
   wherein receivers for the first and second spars are formed between the rear and front girder parts.

8. An aircraft comprising at least one chassis for an air passenger seat of claim 1 or comprising at least one seating group of claim 7.

9. A method for manufacturing a chassis for an air passenger seat,
   wherein the chassis comprises:
   at least one first rear girder part with a first and second receiver;
   at least one first front girder part with a third and fourth receiver;
   at least one second rear girder part with a fifth and sixth receiver;
   at least one second front girder part with a seventh and eighth receiver;
   a first spar;
   a second spar;
   the method comprising the steps of:
   pre-positioning the first spar in the first and fifth receivers;
   pre-positioning the second spar in the second and sixth receivers; and
   fixing the first and second spars with the first and second front girder parts on the first and second rear girder parts, wherein the front girder parts and the back girder parts are adapted for being assembled on a split line along a longitudinal direction of the rear girder part and the front girder part.

* * * * *